US010456852B2

(12) United States Patent
Ide

(10) Patent No.: US 10,456,852 B2
(45) Date of Patent: Oct. 29, 2019

(54) ARC WELDING CONTROL METHOD

(71) Applicant: DAIHEN CORPORATION, Osaka (JP)

(72) Inventor: Akihiro Ide, Osaka (JP)

(73) Assignee: DAIHEN CORPORATION, Osaka (JP)

( * ) Notice: Subject to any disclaimer, the term of this patent is extended or adjusted under 35 U.S.C. 154(b) by 177 days.

(21) Appl. No.: 15/302,765

(22) PCT Filed: Apr. 1, 2015

(86) PCT No.: PCT/JP2015/060347
§ 371 (c)(1),
(2) Date: Oct. 7, 2016

(87) PCT Pub. No.: WO2015/163101
PCT Pub. Date: Oct. 29, 2015

(65) Prior Publication Data
US 2017/0036292 A1 Feb. 9, 2017

(30) Foreign Application Priority Data
Apr. 22, 2014 (JP) .................. 2014-088319

(51) Int. Cl.
*B23K 9/12* (2006.01)
*B23K 9/073* (2006.01)
(Continued)

(52) U.S. Cl.
CPC ................ *B23K 9/12* (2013.01); *B23K 9/073* (2013.01); *B23K 9/09* (2013.01); *B23K 9/095* (2013.01)

(58) Field of Classification Search
CPC .......... B23K 9/073; B23K 9/09; B23K 9/095; B23K 9/12
See application file for complete search history.

(56) References Cited

U.S. PATENT DOCUMENTS 7,705,270 B2 * 4/2010 Norrish .................... B23K 9/09
219/130.21
8,933,370 B2 * 1/2015 Sato ...................... B23K 9/0671
219/130.31
(Continued)

FOREIGN PATENT DOCUMENTS

CN 102149501 8/2011
CN 102271853 12/2011
(Continued)

OTHER PUBLICATIONS

International Search Report and Written Opinion issued in International Patent Application No. PCT/JP2015/060347, dated Jul. 7, 2015, together with an English language translation thereof.
(Continued)

*Primary Examiner* — Ibrahime A Abraham
*Assistant Examiner* — Frederick F Calvetti
(74) *Attorney, Agent, or Firm* — Greenblum & Bernstein, P.L.C.

(57) ABSTRACT

The present invention improves the stability of welding conditions in a welding method that involves cyclically repeating forward feed and reverse feed of a welding wire. Provided is an arc welding control method involving cyclic repetition of forward feed and reverse feed of a welding wire at feed speed, generating short-circuit intervals and arc intervals, during which arc intervals, application of a first welding current is followed by application of a second welding current smaller than the first welding current, wherein the phase of the feed speed at the point in time of transition from an arc interval to a short-circuit interval is detected, and the value and/or the application duration of the first welding current is varied in accordance with the detected phase. In so doing, fluctuation of the phase of the
(Continued)

feed speed due to outside disturbances during generation of short-circuiting can be minimized.

2 Claims, 3 Drawing Sheets

(51) Int. Cl.
*B23K 9/09* (2006.01)
*B23K 9/095* (2006.01)

(56) References Cited

U.S. PATENT DOCUMENTS

| | | | | |
|---|---|---|---|---|
| 9,114,472 B2* | 8/2015 | Matsui | ............ | B23K 9/092 |
| 9,776,273 B2* | 10/2017 | Fujiwara | ............ | B23K 9/073 |
| 2010/0213181 A1* | 8/2010 | Hirota | ............ | B23K 9/0671 |
| | | | | 219/130.31 |
| 2011/0226749 A1* | 9/2011 | Sato | ............ | B23K 9/0671 |
| | | | | 219/130.31 |
| 2012/0074114 A1* | 3/2012 | Kawamoto | ............ | B23K 9/0731 |
| | | | | 219/130.21 |
| 2012/0145691 A1* | 6/2012 | Fujiwara | ............ | B23K 9/073 |
| | | | | 219/130.31 |
| 2012/0255940 A1* | 10/2012 | Fujiwara | ............ | B23K 9/09 |
| | | | | 219/137 R |
| 2013/0068744 A1* | 3/2013 | Matsui | ............ | B23K 9/092 |
| | | | | 219/137 R |
| 2013/0082040 A1* | 4/2013 | Kawamoto | ............ | B23K 9/0731 |
| | | | | 219/137.71 |
| 2013/0082041 A1* | 4/2013 | Kawamoto | ............ | B23K 9/0731 |
| | | | | 219/137.71 |
| 2015/0041449 A1* | 2/2015 | Fujiwara | ............ | B23K 9/073 |
| | | | | 219/130.21 |
| 2016/0368075 A1* | 12/2016 | Ide | ............ | B23K 9/124 |

FOREIGN PATENT DOCUMENTS

| | | | |
|---|---|---|---|
| CN | 102271854 | | 12/2011 |
| CN | 102441722 | | 5/2012 |
| EP | 2216125 | * | 8/2010 |
| JP | 61-42484 | | 2/1986 |
| JP | 4807474 | | 11/2011 |
| JP | 2013-022593 | | 2/2013 |
| WO | 2010/146844 | | 12/2010 |
| WO | 2011/013305 | | 2/2011 |

OTHER PUBLICATIONS

China Office Action, issued in China Patent Application No. 201580006780.3, dated Dec. 5, 2017, together with an English language translation thereof.

* cited by examiner

ARC WELDING CONTROL METHOD

TECHNICAL FIELD

The present invention relates to an arc welding control method of alternating feeding of a welding wire between forward feeding and reverse feeding as to a feeding rate cyclically to generate short-circuiting periods and arc periods and, during the arc period, flowing a second welding current smaller than a first welding current after flowing the first welding current.

BACKGROUND ART

In a typical consumable electrode arc welding, welding is performed by feeding a welding wire as a consumable electrode at a constant feeding rate and generating an arc between the welding wire and base material. In the consumable electrode arc welding, both the welding wire and the base material are mostly placed in a welding state in which a short circuit state and an arc generation state are alternately repeated.

In order to further improve welding quality, there has been proposed a welding method of alternating feeding of a welding wire between forward feeding and reverse feeding cyclically.

FIG. 3 is a waveform diagram of the welding method in which the forward feeding and the reverse feeding are repeated cyclically as to the feeding rate. (A) of this figure shows a waveform of a feeding rate Fw, (B) of this figure shows a waveform of a welding current Iw and (C) of this figure shows a waveform of a welding voltage Vw. Hereinafter explanation will be made with reference to this figure.

As shown in (A) of this figure, in the feeding rate Fw, an upper side and a lower side than 0 represent a forward feeding period and a reverse feeding period, respectively. The forward feeding represents feeding of the welding wire in a direction approaching the base material, whilst the reverse feeding represents feeding of the welding wire in a direction separating from the base material. The feeding rate Fw has a waveform which changes sinusoidally and shifts on the forward feeding side. Thus as an average value of the feeding rate Fw is positive, the welding wire is fed forwardly in average.

As shown in (A) of this figure, the feeding rate Fw is 0 at a time t1. A period from the time t1 to a time t2 corresponds to a forward feeding acceleration period. The feeding rate is the maximum value of the forward feeding at the time t2. A period from the time t2 to a time t3 corresponds to a forward feeding deceleration period. The feeding rate is 0 at the time t3. A period from the time t3 to a time t4 corresponds to a reverse feeding acceleration period. The feeding rate is the maximum value of the reverse feeding at the time t4. A period from the time t4 to a time t5 corresponds to a reverse feeding deceleration period.

Short circuit between the welding wire and the base material occurs mostly before or after the maximum value of the forward feeding at the time t2. This figure shows a case where the short circuit occurs at a time t21 during the forward feeding deceleration period after the maximum value of the forward feeding. If the short circuit occurs at the time t21, the welding voltage Vw rapidly reduces to a short-circuit voltage value of a few volts as shown in (C) of this figure, and the welding current Iw also reduces to an initial current value of a small current value as shown in (B) of this figure. Thereafter the welding current Iw increases with a predetermined inclination. When the welding current reaches a predetermined peak value, the welding current is maintained at this value.

As shown in (A) of this figure, from the time t3, as the feeding rate Fw is placed in the reverse feeding period, the welding wire is reversely fed. The short circuit is released by this reverse feeding, and an arc is regenerated at a time t31. The arc is regenerated mostly before or after the maximum value of the reverse feeding at the time t4. This figure shows a case where the arc is generated at the time t31 during the reverse feeding acceleration period before the maximum value of the reverse feeding.

If the arc is regenerated at the time t31, the welding voltage Vw increases rapidly to an arc voltage value of several tens of volts as shown in (C) of this figure. As shown in (B) of this figure, according to detection control of a narrow part of a droplet as a precursory phenomenon of arc regeneration, the welding current Iw rapidly reduces from a time earlier than the time t31 by several hundreds of µs and becomes a small current value at the arc regeneration time t31. In this respect, if the narrow part is formed at the droplet, a current path become narrow, and hence a resistance value or the welding voltage value between the welding wire and the base material increases. The narrow-part detection is performed by detecting this increase.

As shown in (A) of this figure, from the time t31 to the time t5, the feeding rate Fw is placed in a reverse feeding state. An arc length becomes long during this period. As shown in (B) of this figure, during the period from the time t31 to the time t5, the welding current Iw increases with a predetermined inclination, then reaches a predetermined first welding current value and maintains this value until a predetermined period elapses after the arc regeneration (time t31). Thereafter a second welding current smaller than the first welding current flows until a time 61 where the next short circuit occurs.

As shown in (A) of this figure, the feeding rate Fw is placed in the forward feeding period from the time t5 and reaches a forward feeding peak value at a time t6. Then the next short circuit occurs at a time t61. During a period from the time t5 to the time t61, the welding voltage Vw reduces gradually as shown in (C) of this figure, and the welding current Iw also reduces gradually as shown in (B) of this figure.

As described above, a cycle of the short circuit and the arc substantially coincides with a cycle of the forward feeding and the reverse feeding as to the feeding rate. That is, according to this welding method, the cycle of short circuit and arc can be set to a desired value by suitably setting the cycle of forward feeding and reverse feeding as to the feeding rate. Thus if this welding method is implemented, the cycle of short circuit and arc can be suppressed in its variance and made substantially constant. Consequently the welding can be performed with a small generation amount of spatter and good bead appearance.

However, in the welding method of repeating the forward feeding and the reverse feeding as to the feeding rate, there arises a case where the short circuit does not occur at the suitable timing due to disturbance such as irregular movements of a molten pool and a distance between a power supply tip and the base material, and a change of a welding posture. In this case, as the cycle of short circuit and arc does not synchronise with the cycle of forward feeding and reverse feeding, the cycle of short circuit and arc varies. A method of restoring this asynchronous state to an original synchronous state is disclosed in patent document 1.

According to an invention of the patent document 1, in a case where short circuit does not occur until a feeding rate reaches a predetermined feeding rate during feeding-rate deceleration in forward feeding of a welding wire, cyclical change of the feeding rate is stopped and the feeding rate is controlled to a constant value of a first feeding rate. When short circuit occurs in the forward feeding at the first feeding rate, reduction of the feeding rate from the first feeding rate is started and cyclical change of the feeding rate is restarted to perform the welding. Consequently the asynchronous state is intended to be restored to the synchronous state.

PRIOR ART DOCUMENT

Patent Document

Patent Document 1: Japanese Patent No. 4807474

SUMMARY OF INVENTION

Problems to Be Solved by Invention

According to the invention of the patent document 1, in a case where short circuit does not occur at a suitable timing, the feeding rate is switched to the constant forward feeding rate, and the feeding rate is restored to the original cyclical change when short circuit occurs. However according to this control, as the cycle of the feeding rate is changed by its own control, the welding state sometimes falls in an unstable state.

Accordingly an object of the present invention is to provide an arc welding control method which can suppress a cycle of short circuit and arc falling into an asynchronous state with a cycle of forward feeding and reverse feeding as to a feeding rate while maintaining the cycle of forward feeding and reverse feeding as to the feeding rate constant, and thus perform welding stably.

Means for Solving Problems

In order to solve the above-described problem, according to the present invention, there is provided an arc welding control method of alternating feeding of a welding wire between forward feeding and reverse feeding as to a feeding rate cyclically to generate short-circuiting periods and arc periods and, during the arc period, flowing a second welding current smaller than a first welding current after flowing the first welding current, the arc welding control method comprising: detecting a phase of the feeding rate upon shifting to the short-circuiting period from the arc period, and Changing a value of the first welding current and/or a conduction period of the first welding current according to the detected phase.

According to the present invention, the value of the first welding current and/or the conduction period of the first welding current are changed according to an error between the detected phase and a predetermined short-circuit phase setting value.

Advantageous Effects of Invention

According to the present invention, as a length of the arc period can be adjusted by changing a value of the first welding current and/or the conduction period according to a phase of the feeding rate upon occurrence of the short circuit, the phase of the feeding rate where the short circuit occurs can be suppressed varying. Consequently according to the present invention, a cycle of the short circuit and the arc can be suppressed falling into an asynchronous state with a cycle of the forward feeding and the reverse feeding as to the feeding rate while maintaining the cycle of forward feeding and reverse feeding as to the feeding rate constant, and thus the welding can be performed stably.

EMBODIMENT OF INVENTION

Hereinafter an embodiment according to the present invention will be explained with reference to drawings.

First Embodiment

Figure 1:
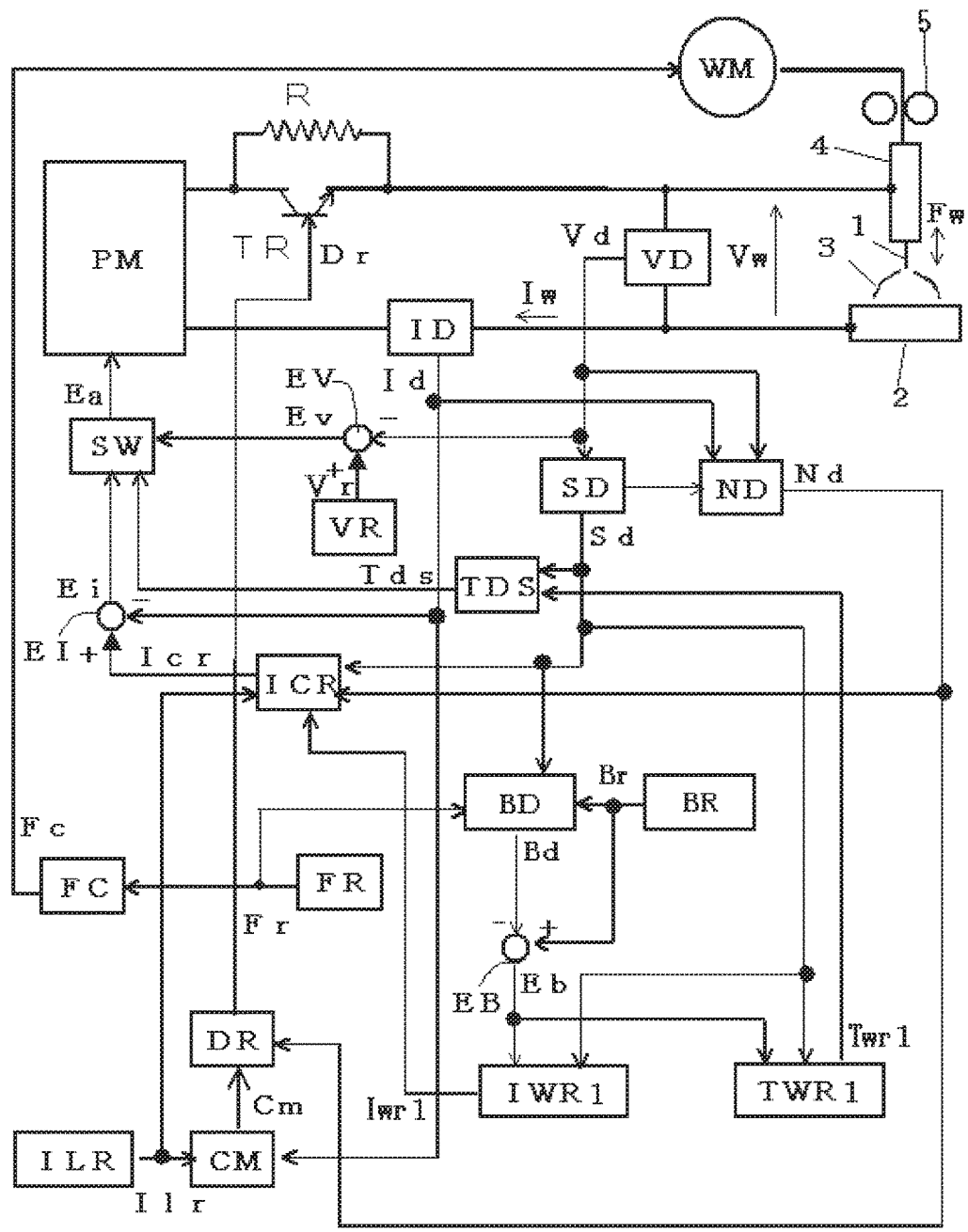
FIG. 1 A block diagram illustrating a welding power supply for implementing an arc welding control method according to a first embodiment of the present invention.

FIG. 1 is a block diagram illustrating a welding power supply for implementing an arc welding control method according to a first embodiment of the present invention. Hereinafter individual blocks will be explained with reference to this figure.

Using a power of three-phase 200V or the like from a commercial power supply (not shown) as input, a power supply main circuit PM subjects the input power to an output control such as an inverter control according to an error amplified signal Ea described later, and outputs a welding voltage Vw and a welding current Iw. Although not shown in the figure, this power supply main circuit PM includes a primary rectifier for rectifying the commercial power supply, a smoothing capacitor for smoothing the rectified DC, an inverter circuit for converting the smoothed DC into a high-frequency AC, a high-frequency transformer for stepping down the high-frequency AC to a voltage value suitable for welding, a secondary rectifier for rectifying the stepped-down high-frequency AC to a DC, a reactor for smoothing the rectified DC, a modulation circuit which performs a pulse width modulation control using the error amplified signal Ea as input, and an inverter driving circuit which drives switching elements of the inverter circuit using a pulse width modulation control signal as input.

A current decreasing resistor R is inserted between the power supply main circuit PM and a welding torch 4. The current decreasing resistor R is set to a value (about 0.5 to 3Ω) ten times or more as large as that of a short-circuit load (about 0.01 to 0.03Ω). When the current decreasing resistor R is inserted into a current path, energy accumulated in a DC reactor within the welding power supply and a reactor of an external cable is rapidly discharged. A transistor TR is connected in parallel to the current decreasing resistor R and controlled so as to be turned on/off according to a drive signal Dr described later.

Using a feed control signal Fc described later as input, a feeding motor WM feeds a welding wire 1 at a feeding rate Fw in a manner of alternating forward feeding and reverse feeding cyclically. A motor having high transient responsiveness is used as the feeding motor WM. In some cases, the feeding motor WM is installed near a tip of the welding torch 4 in order to increase a change rate of the feeding rate Fw and an inversion speed of the feeding direction of the welding wire 1. Further in some cases, a push-pull feeding system is configured by using two feeding motors WM.

The welding wire 1 is fed within the welding torch 4 in accordance with rotation of a feeding roll 5 coupled to the feeding motor WM, and thus an arc 3 is generated between this wire and base material 2. A welding voltage Vw is applied between a power supply tip (not shown) within the welding torch 4 and the base material 2, and thus a welding current Iw flows.

A welding current detection circuit ID detects the welding current Iw and outputs a welding current detection signal Id. A welding voltage detection circuit VD detects the welding voltage Vw and outputs a welding voltage detection signal Vd.

Using the welding voltage detection signal Vd as input, a short-circuit discrimination circuit SD outputs a short-circuit discrimination signal Sd. In a case where a value of the welding voltage detection signal is less than a predetermined short-circuit/arc discrimination value (set to about 10V), the discrimination circuit determines to be a short-circuiting period and outputs the discrimination signal of a high level. In a case where a value of the welding voltage detection signal is the discrimination value or more, the discrimination circuit determines to be an arc period and outputs the discrimination signal of a low level.

As described later in detail with reference to (A) of FIG. 2, a feeding-rate setting circuit FR outputs a feeding-rate setting signal Fr having a predetermined pattern of alternating the forward feeding and the reverse feeding cyclically Using the feeding-rate setting signal Fr as input, a feeding control circuit FC outputs, to the feeding motor WM, the feeding control signal Fc for feeding the welding wire 1 at the feeding rate Fw corresponding to the setting value of this setting signal.

A short-circuit phase setting circuit BR outputs a short-circuit phase setting signal Br for setting a phase of the feeding rate Fw for generating short circuit. Using the feeding-rate setting signal Fr and the short-circuit discrimination signal Sd as input, a short-circuit phase detection circuit BD detects a phase of the feeding-rate setting signal Fr when the short-circuit discrimination signal Sd changes to the high level (short circuit), and outputs as a short-circuit phase detection signal Bd. This operation will be explained later in detail with reference to FIG. 2.

A phase error amplifying circuit EB amplifies an error between the short-circuit phase setting signal Br (+) and the short-circuit phase detection signal Bd (−) and outputs as a phase error amplified signal Eb=G·(Br−Bd). G is a predetermined amplification factor (positive value).

Using the phase error amplified signal Eb and the short-circuit discrimination signal Sd as input, a first welding current setting circuit IWR1 performs a summing of Iwr1=I0+ΣEb during the welding each time the short-circuit discrimination signal Sd changes to the high level (short circuit), and outputs a first welding current setting signal Iwr1. I0 is a predetermined initial value. This circuit performs a feedback control of the first welding current setting signal Iwr1 so that the short-circuit phase detection signal Bd coincides with the short-circuit phase setting signal Br.

Using the phase error amplified signal Eb and the short-circuit discrimination signal Sd as input, a first welding current conduction-period setting circuit TWR1 performs a summing of Twr1=T0+ΣEb during the welding each time the short-circuit discrimination signal Sd changes to the high level (short circuit), and outputs a first welding current conduction-period setting signal Twr1. T0 is a predetermined initial value. This circuit performs a feedback control of the first welding current conduction-period setting signal Twr1 so that the short-circuit phase detection signal Bd coincides with the short-circuit phase setting signal Br.

Using the short-circuit discrimination signal Sd, the welding voltage detection signal Vd and the welding current detection signal Id as input, a narrow-part detection circuit ND outputs a narrow-part detection signal Nd. When a voltage increasing value of the welding voltage detection signal Vd during the high level (short-circuiting period) of the short-circuit discrimination signal Sd reaches a predetermined narrow-part detection reference value, the narrow-part detection circuit determines that a narrow part is formed and outputs the narrow-part detection signal of a high level. The narrow-part detection circuit outputs the narrow-part detection signal of a low level when the short-circuit discrimination signal Sd changes to the low level (arc period), Alternatively the narrow-part detection signal Nd may be changed to the high level when a differential value of the welding voltage detection signal Vd during the short-circuiting period reaches the narrow-part detection reference value corresponding thereto. Further, alternatively, a resistance value of a droplet may be calculated by dividing a value of the welding voltage detection signal Vd by a value of the welding current detection signal Id. Then the narrow-part detection signal Nd may be changed to the high level when a differential value of the resistance value reaches the narrow-part detection reference value corresponding thereto.

A low-level current setting circuit ILR outputs a predetermined low-level current setting signal Ilr. Using the low-level current setting signal Ilr and the welding current detection signal Id as input, a current comparison circuit CM outputs a current comparison signal Cm which becomes a high level in a case of Id<Ilr and a low level in a case of Id≥Ilr.

Using the current comparison signal Cm and the narrow-part detection signal Nd as input, a driving circuit DR outputs, to a base terminal of the transistor TR, the drive signal Dr which changes to a low level when the narrow-part detection signal Nd changes to the high level, and thereafter changes to a high level when the current comparison signal Cm changes to the high level. In this manner, the drive signal Dr changes to the low level when the narrow part is detected, thereby placing the transistor TR in the off state. Thus as the current decreasing resistor R is inserted into the current path, the welding current Iw flowing in the short-circuit load reduces rapidly. Then when the welding current Iw thus rapidly reduced reduces to the value of the low-level current setting signal Ilr, the drive signal Dr changes to the high level, thereby placing the transistor TR in the on state. Thus as the current decreasing resistor R is short-circuited, a normal state is restored.

Using the short-circuit discrimination signal Sd, the low-level current setting signal Ilr, the narrow-part detection signal Nd and the first welding current setting signal Iwr1 as input, a current control setting circuit ICR performs the following processing and outputs a current control setting signal Icr.

1) During a predetermined initial period from a time where the short-circuit discrimination signal Sd changes to the high level (short circuit), outputting a predetermined initial current setting value as the current control setting signal Icr.

2) Thereafter increasing a value of the current control setting signal Icr from the initial current setting value to a predetermined peak setting value with a predetermined inclination upon short circuit, and maintaining the peak setting value.

3) When the narrow-part detection signal Nd changes to the high level, changing a value of the current control setting signal Icr to the value of the low-level current setting signal Ilr and maintaining this value.

4) When the short-circuit discrimination signal Sd changes to the low level arc), increasing the current control setting signal Icr to a value of the first welding current setting signal Iwr1 with a predetermined inclination upon arc and maintaining the increased value.

Using the short-circuit discrimination signal Sd and the first welding current conduction-period setting signal Twr1 as input, an off-delay circuit TDS outputs a delay signal Tds which is off-delayed by a period of the first welding current conduction-period setting signal Twr1 from a time at which the short-circuit discrimination signal Sd changes to the low level from the high level. Thus this delay signal Tds changes to a high level in response to the start of the short-circuiting period and changes to a low level by being off-delayed by the period of the first welding current conduction-period setting signal Twr1 after regeneration of an arc.

A current error amplifying circuit EI amplifies an error between the current control setting signal Icr (+) and the welding current detection signal Id (−) and outputs a current error amplified signal Ei.

A voltage setting circuit VR outputs a predetermined voltage setting signal Vr for setting the welding voltage during the arc period. A voltage error amplifying circuit EV amplifies an error between the voltage setting signal Vr (+) and the welding voltage detection signal Vd (−) and outputs a voltage error amplified signal Ev.

Using the current error amplified signal Ei, the voltage error amplified signal Ev and the delay signal Tds as input, a control switching circuit SW outputs the current error amplified signal Ei as the error amplified signal Ea in a case where the delay signal Tds is at the high level (a period from the start of short circuit to a time elapsing the period of the first welding current conduction-period setting signal Twr1 after the regeneration of arc), whilst outputs the voltage error amplified signal Ev as the error amplified signal Ea in a case where the delay signal is at the low level (arc). According to this circuit, constant current control is performed during both the short-circuiting period and the first welding-current conduction period, whilst constant voltage control is performed during the arc period other than these periods.

Figure 2:
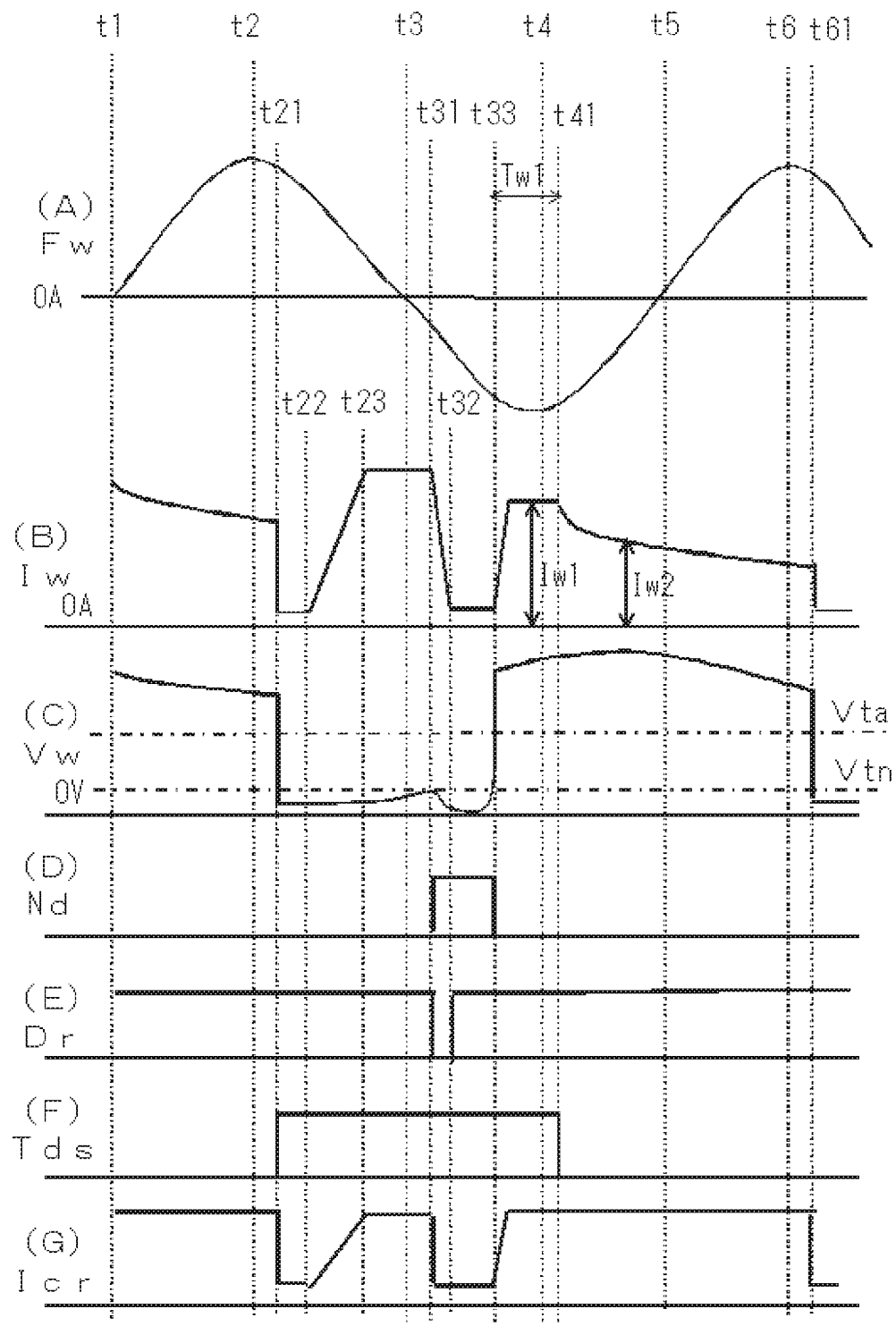
FIG. 2 A timing chart illustrating individual signals in the welding power supply of FIG. 1, for explaining the arc welding control method according to the first embodiment of the present invention.

FIG. 2 is a timing chart illustrating individual signals in the welding power supply of FIG. 1, for explaining the arc welding control method according to the first embodiment of the present invention. (A) of this figure shows temporal change of the feeding rate Fw of the welding wire 1, (B) of this figure shows temporal change of the welding current Iw, (C) of this figure shows temporal change of the welding voltage Vw, (D) of this figure shows temporal change of the narrow-part detection signal Nd. (E) of this figure shows temporal change of the drive signal Dr, (F) of this figure shows temporal change of the delay signal Tds, and (G) of this figure shows temporal change of the current control setting signal Icr. Hereinafter explanation will be made with reference to this figure.

Figure 3:
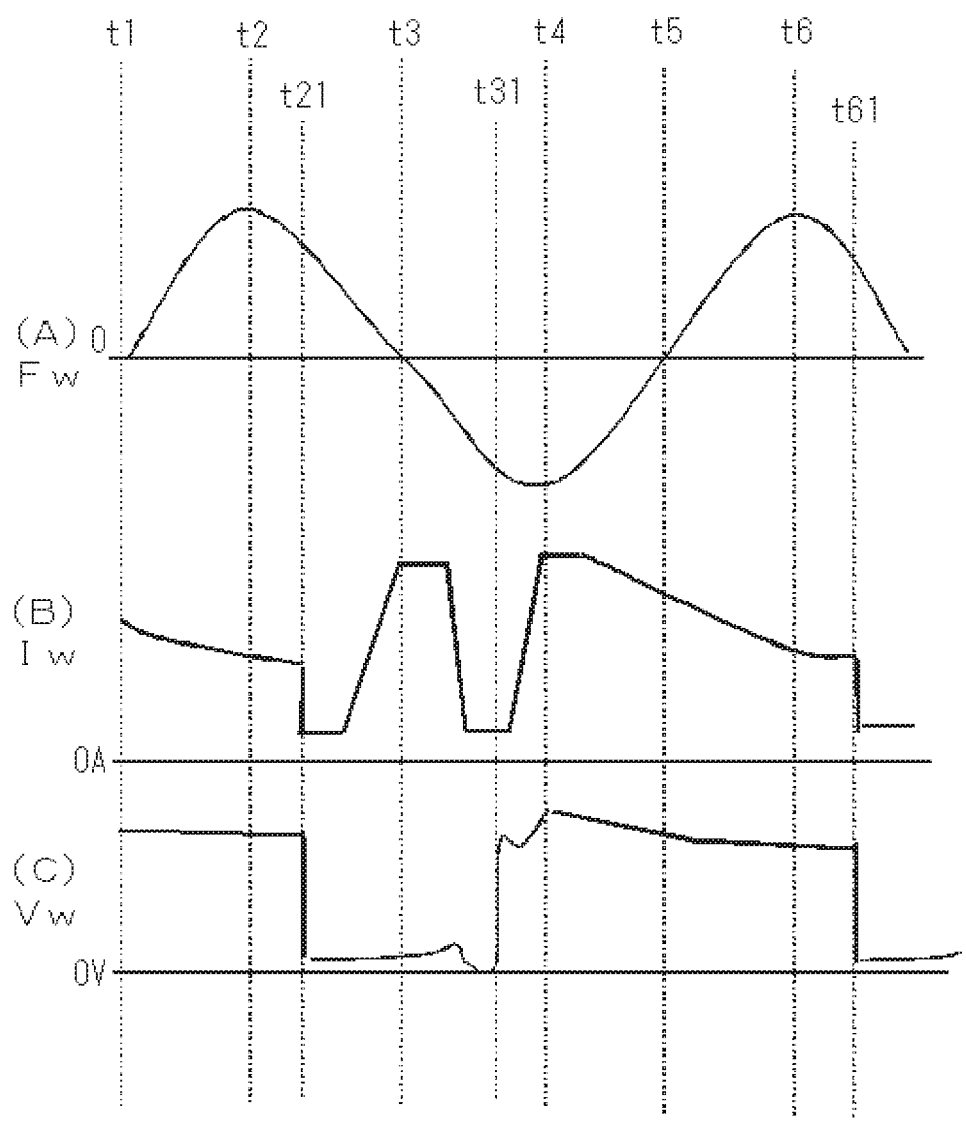
FIG. 3 A waveform diagram in a welding method according to a related art in which forward feeding and reverse feeding are repeated cyclically as to a feeding rate.

As shown in (A) of this figure, in the feeding rate Fw, positive values on an upper side than 0 represent that the welding wire is fed forwardly, and negative values on a lower side than 0 represent that the welding wire is fed reversely. As the feeding rate Fw shown in (A) of this figure is set by the feeding-rate setting signal Fr (not shown), the feeding rate has a waveform similar to that of the feeding-rate setting signal. Further the feeding rate Fw shown in (A) of this figure has the same waveform as that of the feeding rate Fw shown in (A) of FIG. 3.

As shown in (A) of this figure, the feeding rate Fw is 0 at a time t1. A period from the time t1 to a time t2 corresponds to a forward feeding acceleration period. The feeding rate is the maximum value of the forward feeding at the time t2. A period from the time t2 to a time t3 corresponds to a forward feeding deceleration period. The feeding rate is 0 at the time t3. A period from the time t3 to a time t4 corresponds to a reverse feeding acceleration period. The feeding rate is the maximum value of the reverse feeding at the time t4. A period from the time t4 to a time t5 corresponds to a reverse feeding deceleration period. In this manner, the feeding rate Fw has a waveform repeating a period from the time t1 to the time t6 as a single cycle. This single cycle is constant and does not change during the welding. A phase of the feeding rate Fw is 0 degree at the time t1, 90 degrees at the time t2, 180 degrees at the time t3, 270 degrees at the time t4 and 360 degrees (0 degree) at the time t5. Although the feeding rate changes sinusoidally in this figure, the feeding rate may change in a form of a triangular wave or a trapezoidal wave. For example, the forward feeding period from the time t1 to the time t3 is 5.4 ms, the reverse feeding period from the time t3 to the time t5 is 4.6 ms, and a single cycle is 1.0 ms. For example, the maximum value of the forward feeding is 50 m/min and the maximum value of the reverse feeding is −40 m/min An average value of the feeding rate Fw in this case is about +4 m/min and an average value of the welding current is about 150 A.

This figure shows a case were the short-circuit phase setting signal Br (not shown) represents 100 degrees. If the short circuit between the welding wire and the base material occurs at the time t21, the welding voltage Vw reduces rapidly to a short-circuit voltage value of a few volts as shown in (C) of this figure. At this time, the short-circuit phase detection circuit BD detects a phase of the feeding rate Fw (feeding-rate setting signal Fr) upon the occurrence of short circuit and outputs the short-circuit phase detection signal Bd. This figure shows a case of Bd=110 degrees.

Next the phase error amplifying circuit EB outputs the phase error amplified signal Eb=G·(Br−Bd)=G·(100−110) =G·(−10) G is a predetermined amplification factor (positive value). Using the phase error amplified signal Eb as input, the first welding current setting circuit IWR1 and the first welding current conduction-period setting circuit TWR1 of FIG. 1 output the first welding current setting signal Iwr1 and the first welding current conduction-period setting signal Twr1 after the arc generation (time t33), respectively. In this figure, as the phase error amplified signal Eb has a negative value, each of the first welding current setting signal Iwr1 and the first welding current conduction-period setting signal Twr1 reduces, Thus a length of an arc period from the time t33 to a time t61 is controlled to be short. Consequently as an occurrence phase of the next short circuit at the time t61 advances, a value of the short-circuit phase detection signal Bd becomes small and thus approaches a value of the short-circuit phase setting signal Br.

In contrast, in a case where a phase of the short circuit occurred at the time t21 is smaller than a value of the short-circuit phase setting signal Br, each of the first welding current setting signal Iwr1 and the first welding current conduction-period setting signal Twr1 increases. As a result, as an occurrence phase of the next short circuit delays, a value of the short-circuit phase detection signal Bd increases and thus approaches a value of the short-circuit phase setting signal Br.

When the short circuit occurs at the time t21 and discrimination is made that the welding voltage Vw reduces smaller than a short-circuit/arc discrimination value Vta, the delay signal Tds changes to the high level from the low level as shown in (F) of this figure. In response to this, as shown in (G) of this figure, the current control setting signal Icr changes to the predetermined initial current sating value of a small value at the time t21.

Then as the reverse feeding acceleration period starts from the time t3, the feeding rate Fw is switched to the reverse feeding direction. As shown in (G) of this figure, the current control setting signal Icr is the initial current setting value during the predetermined initial period from the time t21 to a time t22, then increases with the predetermined inclination upon short circuit during a period from the time t22 to a time t23, and is the predetermined peak setting value during a period from the time t23 to a time t31. As described above, as the constant current control is performed during the short-circuiting period, the welding current Iw is controlled to a value corresponding to the current control setting signal Icr. Thus as shown in (B) of this figure, the welding current Iw rapidly reduces at the time t21 from the welding current value during the arc period, then is an initial current value during the initial period from the time t21 to the time t22, then increases with an inclination upon short circuit during the period from the time t22 to the time t23, and is a peak value during the period from the time t23 to the time t31. For example, the initial period is set to 1 ms, the initial current is set to 50 A, the inclination upon short circuit is set to 400 A/ms and the peak value is set to 450 A. As shown in (D) of this figure, the narrow-part detection signal Nd is the high level during a period from the time t31 to the time t33 described later and is the low level during a period other than this period. As shown in (E) of this figure, the drive signal Dr is the low level during a period from the time t31 to a time t32 described later and is the high level during a period other than this period. Accordingly, during the period before the time t31 in this figure, as the drive signal Dr is the high level, the transistor TR of FIG. 1 is placed in the on state. Thus as the current decreasing resistor R is short-circuited, the welding power supply is placed in the same state as a normal consumable electrode type arc welding power supply.

As shown in (C) of this figure, the welding voltage Vw increases almost from the time t23 at which the welding current Iw reaches the peak value. This is because a narrow part is gradually formed at a droplet due to the reverse feeding of the welding wire and a pinch force of the welding current Iw.

If the narrow-part forming state reaches a reference state at the time t31, the narrow-part detection signal Nd changes to the high level as shown in (D) of this figure. In response to this, as shown in (E) of this figure, as the drive signal Dr becomes the low level, the transistor TR of FIG. 1 is placed in the off state and hence the current decreasing resistor R is inserted into the current path. Simultaneously as shown in (G) of this figure, the current control setting signal Icr reduces to the value of the low-level current setting signal Ilr. Thus as shown in (B) of this figure, the welding current Iw rapidly reduces to a low-level current value Il from the peak value. Then, when the welding current Iw reduces to the low-level current value Il at the time t32, the drive signal Dr is restored to the high level as shown in (E) of this figure.

Thus the transistor TR of FIG. 1 is placed in the on state and hence the current decreasing resistor R is short-circuited. As shown in (B) of this figure, as the current control setting signal Icr is maintained to the value of the low-level current setting signal Ilr, the welding current Iw maintains the low-level current value Il until an arc is regenerated at the time t33. Accordingly the transistor TR is placed in the off state only during the period from the time t31 at which the narrow-part detection signal Nd changes to the high level to the time t32 at which the welding current Iw reduces to the low-level current value Il. As shown in (C) of this figure, as the welding current Iw becomes small, the welding voltage Vw once reduces from the time t31 and thereafter increases rapidly. The low-level current value Il is set to, for example, 50 A.

If the narrow part is promoted due to the reverse feeding of the welding wire and the pinch force of the flowing of the welding current Iw and then the arc is regenerated at the time t33, a value of the welding voltage Vw becomes the short-circuit/arc discrimination value Vta or more as shown in (C) of this figure.

As the reverse feeding deceleration period starts from the time t4 immediately after the regeneration of the arc, the feeding rate Fw reduces while maintaining the reverse feeding state, as shown in (A) of this figure. If the arc is regenerated at the time t33, as shown in (G) of this figure, a value of the current control setting signal Icr increases with the predetermined inclination upon arc from the value of the low-level current setting signal Ilr, then reaches the value of the first welding current setting signal Iwr1 and thereafter maintains this value. As shown in (F) of this figure, the delay signal Tds maintains the high level until a time t41 at which a period Td of the first welding current conduction-period setting signal Twr1 elapses after the regeneration of the arc at the time t33. Thus as the welding power supply is subjected to the constant current control until the time t41, as shown in (B) of this figure, the welding current Iw increases with an inclination upon arc from the time t33, then reaches the value of the first welding current setting signal Iwr1 and maintains this value until the time t41. As shown in (C) of this figure, the welding voltage Vw is placed in a first welding-voltage value state of a large value during a first welding-current conduction period Tw1 from the time t33 to the time t41. As shown in (D) of this figure, the narrow-part detection signal Nd changes to the low level at the time t33 due to the regeneration of the arc. For example, the inclination upon arc is set to 400 A/ms.

As shown in (F) of this figure, the delay signal Tds changes to the low level at the time t41, As a result, the welding power supply is switched to the constant voltage control from the constant current control. Until the time t5 from the time t33 at which the arc is regenerated, as the welding wire is reversely fed, the arc length becomes longer gradually. As the forward feeding acceleration period starts from the time t5, the feeding rate Fw is switched to the forward feeding as shown in (A) of this figure. If the welding power supply is switched to the constant voltage control at the time t41, as shown in (B) of this figure, a second welding current Iw2 gradually reducing from the first welding current Iw1 flows as the welding current Iw. Similarly, the welding voltage Vw gradually reduces from the first welding voltage value as shown in (C) of this figure.

The next short circuit occurs at the time t61 after the maximum value of the forward feeding at the time t6. An occurrence phase of this short circuit approaches the value of the short-circuit phase setting signal Br than the occurrence phase of the short circuit at the time t21. Thus as the phase of the feeding rate Fw at which short circuit occurs is maintained almost constant even if a disturbance occurs, the cycle of short circuit and arc can be suppressed falling into an asynchronous state with the cycle of forward feeding and reverse feeding as to the feeding rate. In this case, one cycle of the feeding rate Fw from the time t1 to the time t5 is constant and does not change.

Although the first embodiment is explained as to the case where each of the first welding current setting signal Iwr1 and the first welding current conduction-period setting signal Twr1 is subjected to the feedback control according to the phase error amplified signal Eb, only either of these signals may be controlled.

According to the first embodiment, a phase of the feeding rate, upon shifting to the short-circuiting period from the arc period, is detected, and a value of the first welding current and/or the conduction period are changed according to the detected phase. Thus as the length of the arc period can be adjusted by changing a value of the first welding current and/or the conduction period according to a phase of the feeding rate upon occurrence of the short circuit, the phase of the feeding rate where the short circuit occurs can be suppressed varying. Consequently according to the embodiment, the cycle of short circuit and arc can be suppressed falling into an asynchronous state with the cycle of forward feeding and reverse feeding as to the feeding rate while maintaining the cycle of forward feeding and reverse feeding as to the feeding rate constant, and thus the welding can be performed stably.

INDUSTRIAL APPLICABILITY

The present invention can provide the arc welding control method which can suppress the cycle of short circuit and arc falling into an asynchronous state with the cycle of forward feeding and reverse feeding as to the feeding rate while maintaining the cycle of forward feeding and reverse feeding as to the feeding rate constant, and thus perform the welding stably.

Although the present invention is explained with reference to the particular embodiment, the present invention is not limited thereto but the embodiment may be changed in various manners within a range not departing from the technical concept disclosed in the present invention.

This application is based on Japanese Patent Application (Japanese Patent Application No. 2014-088319) filed on Apr. 22, 2014, the content of which is incorporated herein by reference.

DESCRIPTION OF REFERENCE NUMERALS 1 welding wire
2 base material
3 arc
4 welding torch
5 feeding roll
BD short-circuit phase detection circuit
Bd short-circuit phase detection signal
BR short-circuit phase setting circuit
Br short-circuit phase setting signal
CM current comparison circuit
Cm current comparison signal
DR driving circuit
Dr drive signal
Ea error amplified signal
EB phase error amplifying circuit
Eb phase error amplified signal
El current error amplifying circuit
Ei current error amplified signal
EV voltage error amplifying circuit
Ev voltage error amplified signal
FC feeding control circuit
Fc feeding control signal
FR feeding-rate setting circuit
Fr feeding-rate setting signal
Fw feeding rate
ICR current control setting circuit
Icr current control setting signal
ID welding current detection circuit
Id welding current detection signal
Il low-level current value
ILR low-level current setting circuit
Ilr low-level current setting signal
Iw welding current
Iw1 first welding current
IW2 second welding current
IWR1 first welding current setting circuit
Iwr1 first welding current setting signal
ND narrow-part detection circuit
Nd narrow-part detection signal
PM power supply main circuit
R current decreasing resistor
SD short-circuit discrimination circuit
Sd short-circuit discrimination signal
SW control switching circuit
TDS off-delay circuit
Tds delay signal
TR transistor
Tw1 first welding-current conduction period
TWR1 first welding current conduction-period setting circuit
Twr1 first welding current conduction-period setting signal
VD welding voltage detection circuit
Vd welding voltage detection signal
VR voltage setting circuit
Vr voltage setting signal
Vta short-circuit/arc discrimination value
Vw welding voltage
WM feeding motor

The invention claimed is:

1. An arc welding control method comprising:
cyclically alternating, in feeding of a welding wire, forward feeding and reverse feeding as to a feeding rate, to generate short-circuiting periods and arc periods,
during the arc period, flowing a second welding current smaller than a first welding current after flowing the first welding current,
detecting a phase of the feeding rate upon shifting to the short-circuiting period from the arc period, and
changing at least one of an amount of the first welding current or a length of a conduction period of the first welding current according to the detected phase of the feeding rate, without changing a cycle length of the forward feeding and reverse feeding as to the feeding rate, based on the change in the at least one of the amount of the first welding current or the length of the conduction period of the first welding current.

2. The arc welding control method according to claim 1, wherein at least one of the amount of the first welding current or the length of the conduction period of the first welding current is changed according to a difference between the detected phase of the feeding rate and a predetermined short-circuit phase value.

\* \* \* \* \*